(12) United States Patent
Horwitz

(10) Patent No.: US 6,503,426 B1
(45) Date of Patent: Jan. 7, 2003

(54) PROCESS FOR MAKING FOAM LAMINATES

(76) Inventor: David James Horwitz, 20 Tarrow Ridge Rd., Savannah, GA (US) 31411

( * ) Notice: Subject to any disclaimer, the term of this patent is extended or adjusted under 35 U.S.C. 154(b) by 55 days.

(21) Appl. No.: 09/656,281

(22) Filed: Sep. 6, 2000

Related U.S. Application Data

(60) Provisional application No. 60/216,214, filed on Jul. 6, 2000.

(51) Int. Cl.[7] .......................... B29C 44/06; B29C 44/12
(52) U.S. Cl. .................. 264/46.5; 264/46.4; 264/46.6; 264/46.7
(58) Field of Search ............................. 264/46.4, 46.5, 264/46.6, 46.7

(56) References Cited

U.S. PATENT DOCUMENTS

| | | | |
|---|---|---|---|
| 2,845,997 A | * 8/1958 | Waite ........................ 156/79 |
| 3,966,526 A | 6/1976 | Doerfling |
| 4,247,347 A | 1/1981 | Lischer et al. |
| 4,247,348 A | 1/1981 | Lischer |
| 4,264,386 A | 4/1981 | Sears, Jr. et al. |
| 4,264,544 A | 4/1981 | Wilheim |
| 4,287,143 A | 9/1981 | Sears, Jr. et al. |
| 4,379,190 A | 4/1983 | Schenck |
| 4,397,798 A | 8/1983 | Parten |
| 4,400,336 A | * 8/1983 | Thomas ..................... 264/46.7 |
| 4,438,228 A | 3/1984 | Schenck |
| 4,726,860 A | 2/1988 | Leach |
| 4,792,482 A | 12/1988 | Leach |
| 4,795,521 A | 1/1989 | Leach |
| 4,873,041 A | 10/1989 | Masui et al. |
| 4,992,224 A | * 2/1991 | Swenson et al. ........... 264/46.7 |
| 4,997,707 A | 3/1991 | Otawa et al. |
| 5,017,115 A | * 5/1991 | Yanagishita et al. ....... 264/46.7 |
| 5,043,114 A | * 8/1991 | Saito et al. ................ 264/46.7 |
| 5,133,912 A | 7/1992 | Hagiwara et al. |
| 5,176,860 A | * 1/1993 | Storch ....................... 264/46.7 |
| 5,196,151 A | * 3/1993 | Sakaida et al. ............ 264/46.7 |
| 5,219,629 A | 6/1993 | Sobolev |
| 5,268,203 A | 12/1993 | Batdorf |
| 5,292,465 A | 3/1994 | Kobayashi et al. |
| 5,354,397 A | 10/1994 | Miyake et al. |
| 5,370,831 A | * 12/1994 | Blair et al. .................... 264/24 |
| 5,413,840 A | 5/1995 | Mizuno |
| 5,466,511 A | 11/1995 | O'Dell et al. |
| 5,478,136 A | * 12/1995 | Takeuchi et al. ........... 264/46.7 |
| 5,492,589 A | 2/1996 | Mizuno |
| 5,569,420 A | 10/1996 | Van Horne |
| 5,580,621 A | 12/1996 | Kuszaj et al. |
| 5,589,243 A | 12/1996 | Day |
| 5,702,806 A | 12/1997 | O'Dell et al. |
| 5,756,022 A | 5/1998 | Siegel et al. |
| 5,763,048 A | 6/1998 | Takahashi |
| 5,783,287 A | * 7/1998 | Yamamoto et al. ........ 264/46.7 |
| 5,807,608 A | 9/1998 | O'Dell et al. |
| 5,820,813 A | 10/1998 | Hara et al. |
| 5,834,082 A | 11/1998 | Day |
| 5,853,512 A | 12/1998 | McKinney |
| 5,866,207 A | 2/1999 | O'Dell et al. |
| 5,866,208 A | 2/1999 | O'Dell et al. |
| 5,866,209 A | 2/1999 | O'Dell et al. |
| 5,869,138 A | 2/1999 | Nishibori |
| 5,869,173 A | 2/1999 | Zheng et al. |
| 5,879,495 A | 3/1999 | Evans |
| 5,894,048 A | 4/1999 | Eckart et al. |
| 5,941,622 A | 8/1999 | Davidson et al. |
| 5,948,505 A | 9/1999 | Puppin |
| 5,972,260 A | 10/1999 | Manni |
| 5,993,721 A | * 11/1999 | Kurihara et al. ........... 264/46.8 |

FOREIGN PATENT DOCUMENTS

| | | | | |
|---|---|---|---|---|
| DE | 28 51 196 | * | 6/1979 | ................. 264/46.7 |
| GB | 851763 | * | 10/1960 | ................. 264/46.7 |
| JP | 60-176731 | * | 9/1985 | ................. 264/46.7 |
| JP | 61-100424 | * | 5/1986 | ................. 264/46.7 |

OTHER PUBLICATIONS

PCT, International Search Report, PCT/US01/21483, pp 1–3, Nov. 2, 2001, Washington, DC.

* cited by examiner

*Primary Examiner*—Allan R. Kuhns
(74) *Attorney, Agent, or Firm*—Dority & Manning, PA

(57) ABSTRACT

A method and apparatus for fabrication of foam laminates suitable for use in the construction of furniture and case goods are provided. The panel has an upper surface formed from a thermoplastic sheet of material such as PVC. A cavity formed by the interior surfaces of the sheet have suspended therein attachment or mounting hardware which is subsequently encapsulated by an in situ structural foaming step. The resulting laminated panel is useful as a table top, shelving, and as a structural component in a variety of case goods and furniture.

12 Claims, 9 Drawing Sheets

PROCESS FOR MAKING FOAM LAMINATES

This Application claims the benefit of Provisional Application 06/216,214 filed Jul. 6, 2000.

BACKGROUND OF THE INVENTION

In the manufacture of furniture such as tables, case goods, cabinetry, desks, shelves and related items, a wide variety of materials have been used. For instance, depending upon the desired market and price, furniture materials may range from low cost plastic molded units and particle board constructions to mid range wooden laminates to higher end premium wood or metal construction. Where a real wood or a high quality simulated wood appearance is sought, such products are difficult to find in a durable, versatile furniture. Furniture constructed from particle board is extremely heavy, has poor strength characteristics, and suffers from a loss of integrity when exposed to moisture. Laminated wood products are easily damaged and are difficult to repair since the surface features and texture of the laminate covering are not shared with the underlying wood or particle board substrate.

Accordingly, there is a need for improvements for providing finished furniture, case good products, and laminated panels which overcomes the limitations of the prior art.

SUMMARY OF THE INVENTION

It has now been discovered that a process and resulting product provides for a furniture grade, non-wood laminate which is useful in a variety of furniture constructions. The laminate comprises a thermoformable sheet which may be molded into a desired configuration. An interior cavity formed by curved edge walls formed in the thermoformable sheet is then used as part of a mold cavity into which a polyurethane foam is injected and cured. Following curing of the foam, the exposed foam surface may be covered with a decorative paper, vinyl, or fabric covering.

Typically, the resulting laminate is interconnected to other laminate pieces or, in the example of a laminated table top, legs may be attached to the laminated top. Accordingly, appropriate mounting or attachment hardware may be suspended or placed within the cavity by appropriate jig(s). The jigs hold the mounting hardware in the desired three-dimensional spacial orientation during the foaming and curing step.

Upon hardening of the structural foam, the mounting hardware is permanently attached to the laminate by the adhesive properties of the cured foam. The cured structural foam also imparts a great deal of rigidity to the resulting laminate, yet adds little additional weight. The thermoplastic molded sheet and the interior molded foam of the laminate are largely impervious to water, durable, and may be further milled, sawed, drilled or worked as needed for use as a laminate in general furniture making needs.

The resulting laminates may be made of a wide range of thicknesses to accommodate various construction needs. The thermoformable materials may be selected from extruded sheets of pigmented and wood grained poly-vinyl chloride (PVC). PVC materials have an accepted appearance within the market place and may be provided in a number of color combinations. Further, various types of texture may be molded into the PVC sheet when thermoformed. Combined with the nearly indestructible properties of PVC along with the ease of repair of scratches and other blemishes, PVC has useful attributes as a laminate component. When used as part of a rigid foam laminate, a PVC sheet having a thickness of 2–3 mm provides a laminate having excellent strength and rigidity properties. However, other thermoformable sheet material may be used in place of the PVC.

The use of a thermoplastic material, such as PVC, has advantages in that the surface of the laminate may be easily repaired by using various grades of sandpaper or steel wool and buffing with a rubbing compound to restore the surface of the damaged laminate to an attractive state. Conventional furniture laminates of pressed wood fibers or thin surface veneers are difficult to repair in a manner which restores an original appearance.

The ability to position and mold in situ the attachment hardware simplifies assembly of a finished furniture article. Further, the assembled article is stronger than similar articles made from a compressed wood or whole wood since the material integrity is not compromised by conventional hardware installation techniques. Since no cutting, drilling, or other invasive action is applied to the substrate, the material integrity is maintained. This improvement is important given that failure or weakening of attachment sites and hardware is a common occurrence in traditionally constructed furniture.

Hence, in one aspect, the invention resides in a method for making a laminate panel useful in furniture making. The laminate is formed by a process in which a sheet of a high impact wood grained PVC of about 2 mm in thickness is heated in an oven to a softening temperature. The heated PVC sheet is then stamped between a male and female mold into a form which, in one sample embodiment, may resemble a tray which defines a cavity area. The tray cavity is positioned within a foam molding station with the tray cavity being accessible to one or more jigs. The jigs are used to suspend inserts, such as mounting hardware and/or structural reinforcements, into the tray cavity area. The tray area is filled with a structural foam such as polyurethane using standard foam reagents and methods. Conventional polyurethane foam reagents and methods are well known within the art as set forth in U.S. Pat. Nos. 5,972,260 and 5,941,622 which are incorporated herein by reference.

The foam cures into a rigid structure which surrounds the insert portions positioned within the cavity. The tray is then inverted so that the tray top may form the upward-facing surface of a table top, counter top, or similar article. Legs or other attachments may then be made using the inserts or mounting hardware previously foamed in place.

In another aspect, the invention resides in the foregoing method and resulting product wherein the inserts are suspended partially within the cavity but do not make contact with the PVC molded article. The sequential foaming and curing steps thereby provides a layered structural foam between the sheet material and the insert. In accordance with this invention it has been found that by avoiding direct contact between a load bearing insert and the thermoformable sheet, a better distribution of forces occurs. As such, bulges or indentations which may otherwise occur from the transfer of forces between an insert and the laminate surface material are avoided.

In yet another aspect of this invention, it has been found that the strength of conventional inserts used in the present laminated construction may be improved by increasing the surface area and/or orientation of the insert with respect to the foam substrate. For instance, the strength between the foam and a bracket may be increased by providing an angled bend to the bracket portion within the foam. The structural integrity of the foam laminate portion may be increased by altering the three-dimensional shape of the laminate as well.

Further, the incorporation of structural members having a higher rigidity than the thermoplastic laminate may be used. Such structural members may be of wood, steel, or rigid plastic. These inserts may be placed in high stress areas and may be installed in a manner similar to various attachment hardware.

These and other aspects of the invention will be described in greater detail in reference to the drawings.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings.

DETAILED DESCRIPTION OF THE INVENTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same apparatus or process pathway. To avoid redundancy, detailed descriptions of much of the apparatus once described in relation to a figure is not repeated in the descriptions of subsequent figures, although such apparatus or process is labeled with the same reference numbers.

Figure 1A:
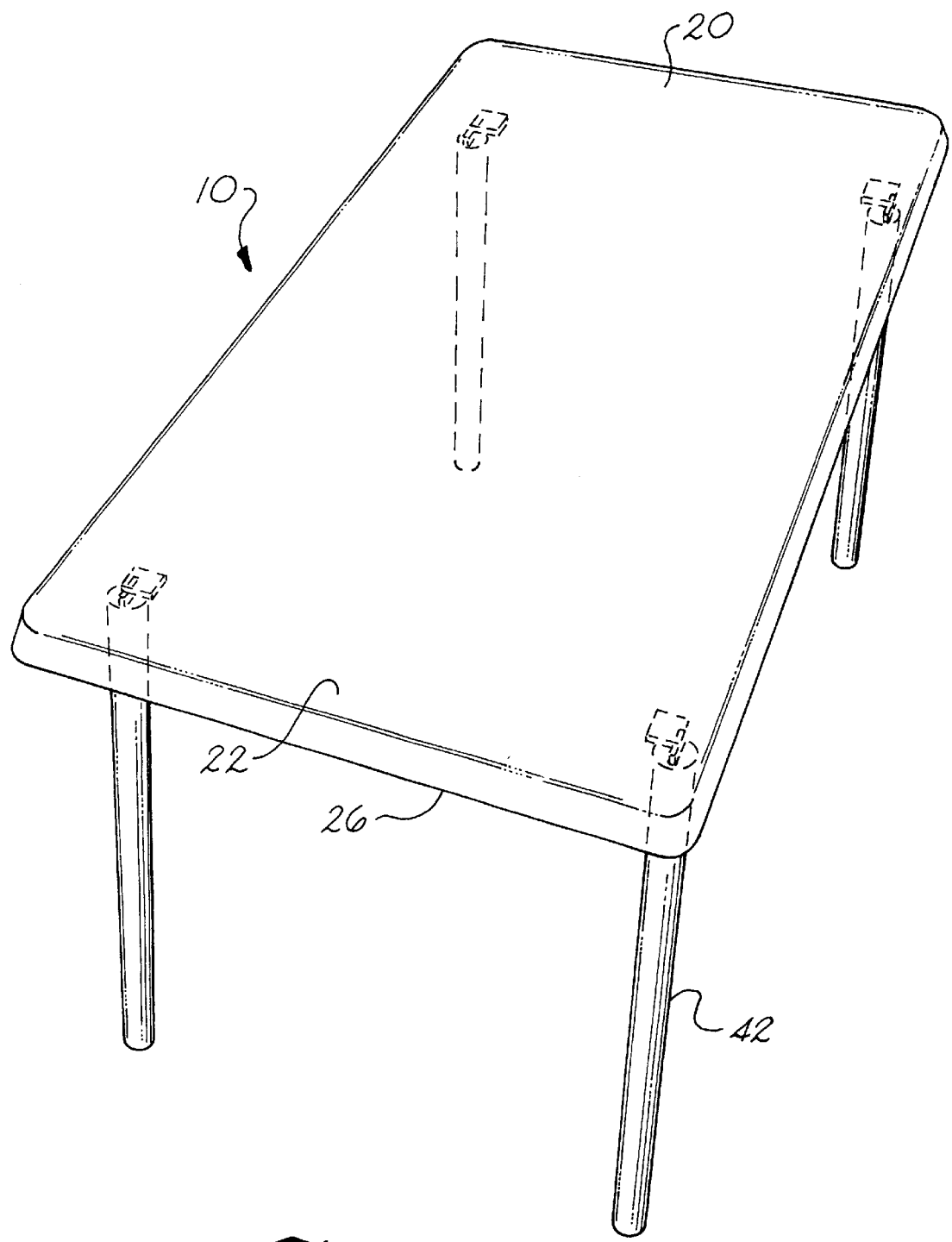
FIG. 1A is a perspective view of a table formed from a laminate of the present invention.

Referring first to FIG. 1A there is illustrated a work surface seen in the form of a table 10. Table 10 has an upper work surface formed from a thermoplastic sheet of material such as PVC. The sheet has an exterior surface 22 seen here as the upper table surface and an interior surface best seen in reference to FIG. 2A. A curved edge 26 curves in a downward direction relative to an upper plane of surface 22 thereby forming an inverted tray-like configuration. As seen in reference to FIG. 2A, a cavity 28 is defined by the outer edge wall 26 and the interior surface 24 of the thermoplastic sheet 20.

Figure 2A:
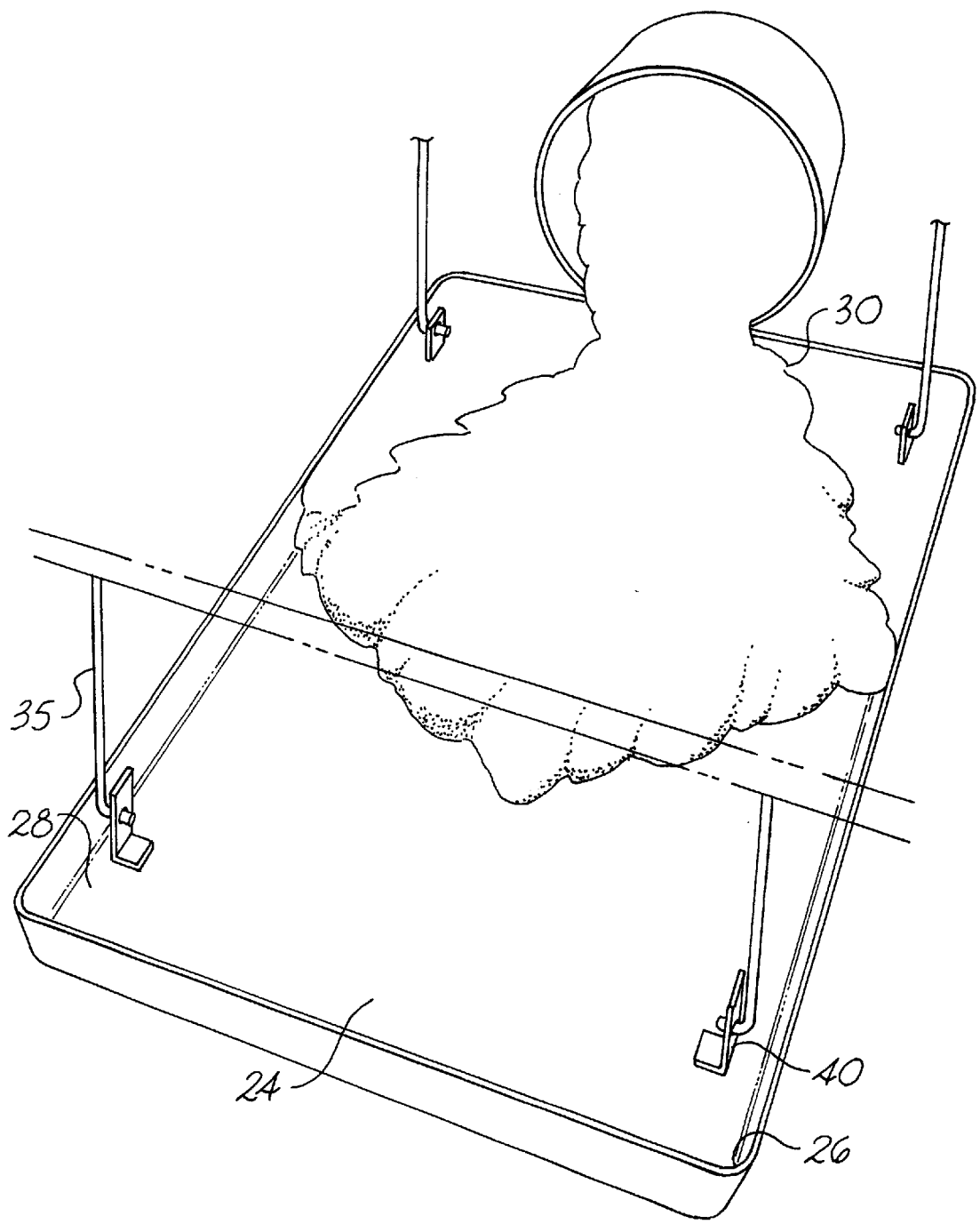
FIG. 2A is a perspective view illustrating various process steps and equipment used to form a laminate of the present invention.

As best seen in reference to FIG. 2A, a jig 35 is used to suspend a plurality of inserts 40 which are suspended at least in part within the cavity 28. Preferably, the suspended inserts 40 make no direct contact with the thermoplastic sheet 20. A structural foam 30, such as a polyurethane foam available from Custom Rigid Formulation, is introduced through an injection gun or similar apparatus into the mold and allowed to cure. The polyurethane foam has a density of 11 pounds per cubic foot, with component A preset at a ratio of 1 to 0.89 to component B and using water as an initiator and blowing agent. However, other structural foams may be used. While not separately illustrated, the foaming step is carried out in a foam molding unit, the upper mold half configured to accommodate the inserts and jigs while providing a platen surface which is pressed flat against the lower walls of edge 26 and the decorative layer 37. If desired, the platen surface may be used to create depressions on other molded shapes within the surface of the cured form.

Figure 2B:
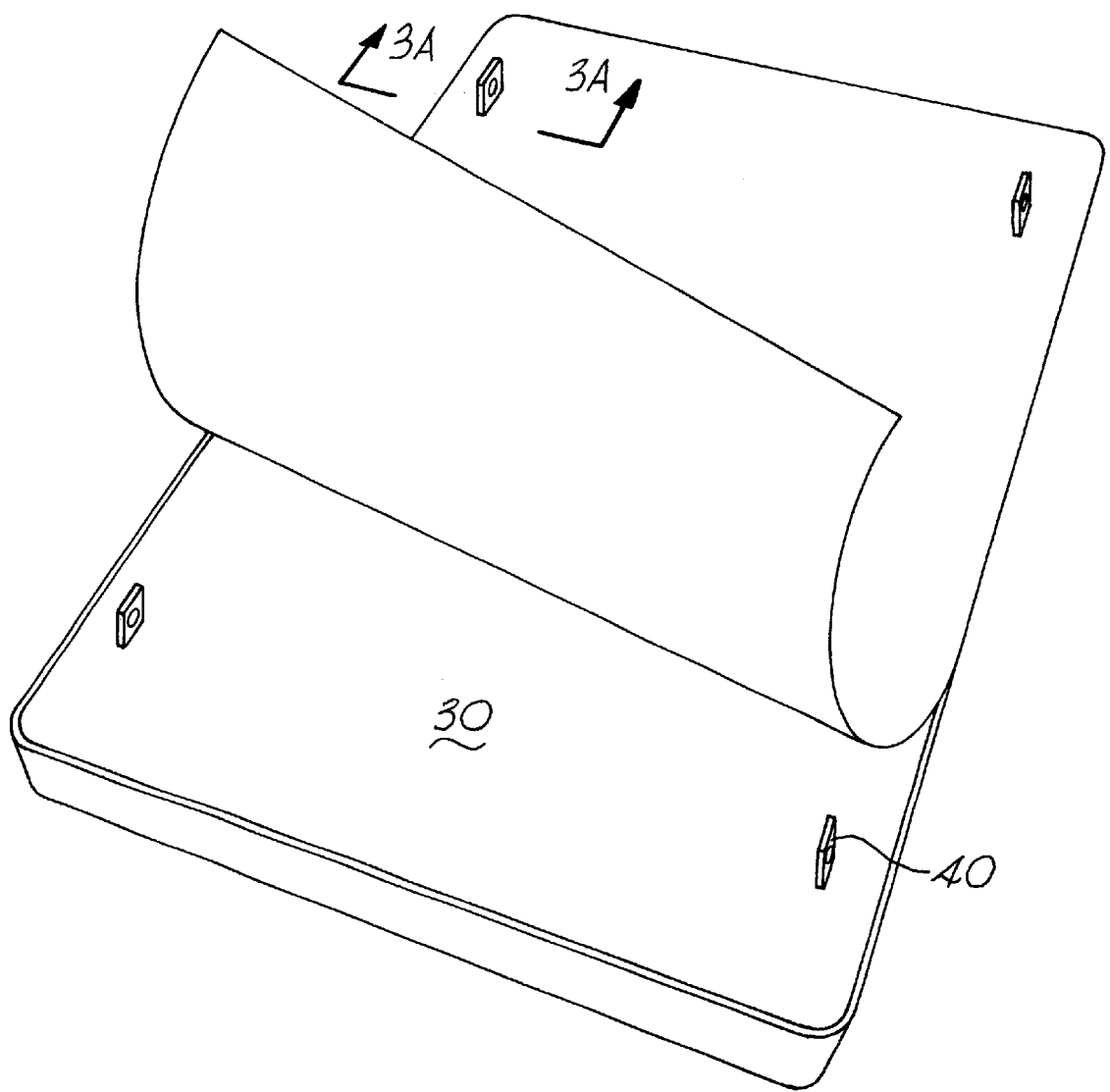
FIG. 2B is a perspective view similar to FIG. 2A setting forth additional steps of the laminate making process.

As seen in FIG. 2B, following the foaming step, the cured rigid structural polyurethane 30 has filled in cavity 28 and is substantially flush with the outer edge walls 26. Each insert 40 is at least partially embedded within the foam in the desired three-dimensional configuration initially established by the jigs 35. If desired, a backing layer 37 may be attached to the exposed foam surface during the foam molding step using the foam as an adhesive. Backing 37 may be in form of a decorative fabric, cardboard, or other covering and may be applied to the foam post-curing by use of a separate adhesive.

Figure 3A:
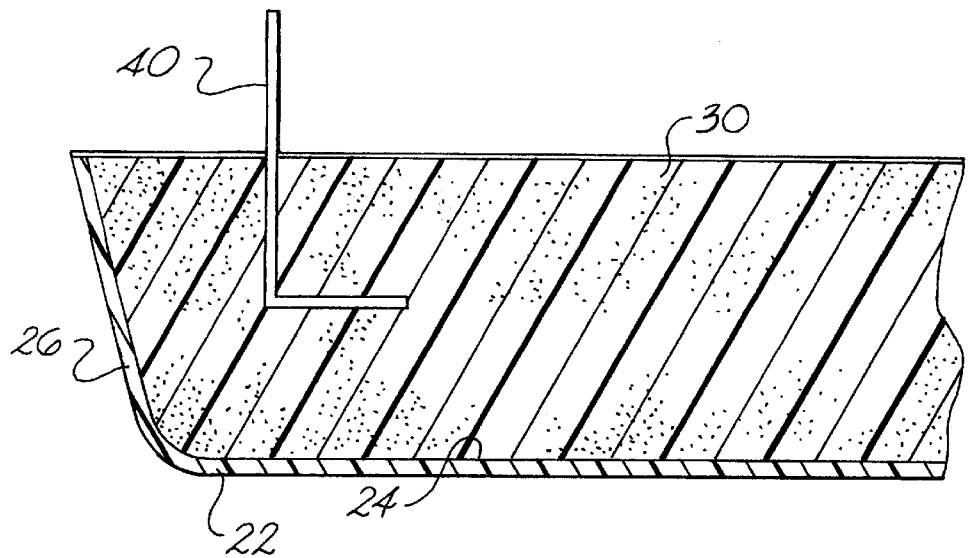
FIG. 3A is a sectional view taken along line 3—3 of FIG. 2B.
Figure 3B:
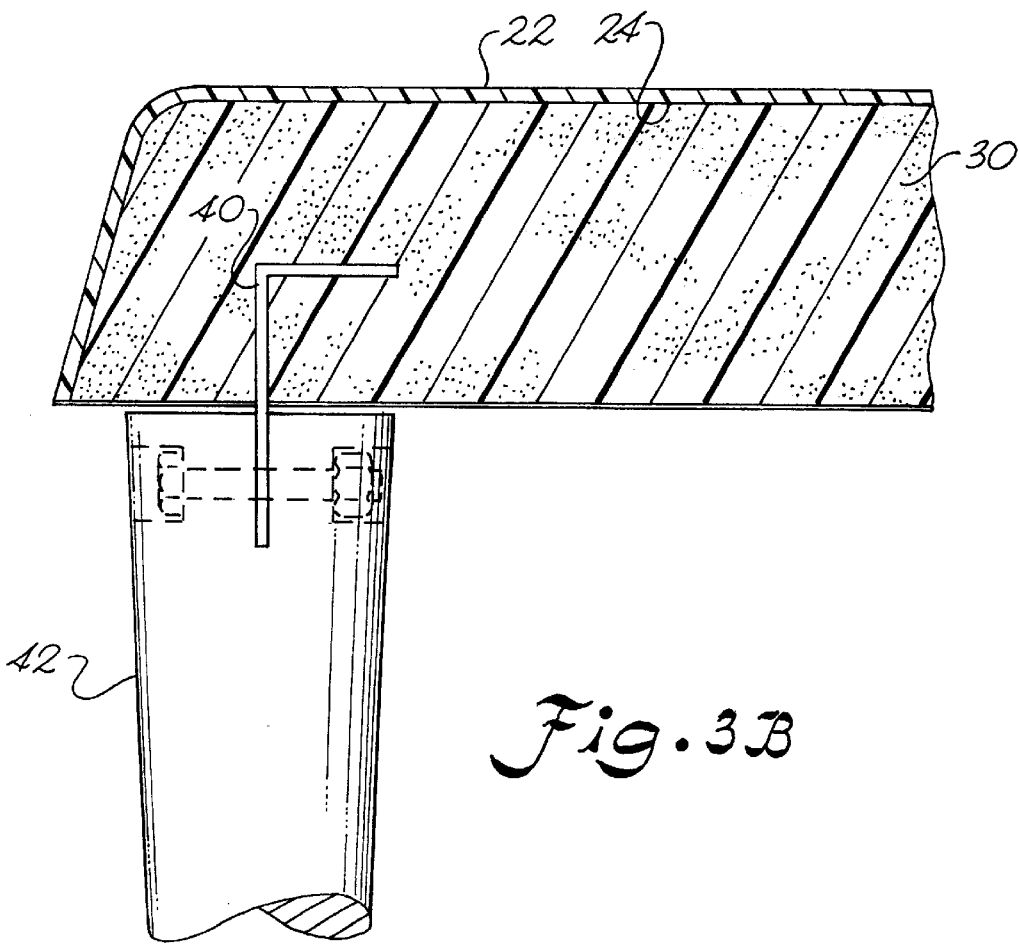
FIG. 3B is a sectional view showing additional details of construction of a table formed from a laminate of the present invention.

As seen in reference to FIG. 3A, the foam 30 fills the cavity defined between edges 26 and interior sheet surface 24. Insert 40, suspended a set distance from any wall surface of sheet 20, is surrounded in part by the rigid foam. As best seen in reference to FIG. 3B, insert 40 may serve as an attachment point for additional accessories such as a table leg 42. While insert 40 is illustrated as an L-shaped bracket defining a plurality of apertures, insert 40 may be provided by any conventional connectors or hardware. For example, hardware such as a folding bracket, height adjustment mechanisms, or tilt top mechanisms, may be used and secured as described above.

Additional inserts 40 may be provided in the form of reinforcing members which may be added within the cavity in high stress areas prior to foaming. Further, in some applications, it may be useful to add wooden blocks or board members within the foamed cavity. The wooden structural member may thereafter be used as an attachment area for various connectors such as screws or nails. For instance, where the laminate of the present invention is provided in the form of a rectangular countertop, a wood member may be placed within the foamed cavity. The wood member may thereafter be used to anchor traditional screws or lag bolts which position the countertop to a lower support frame.

Figure 1B:
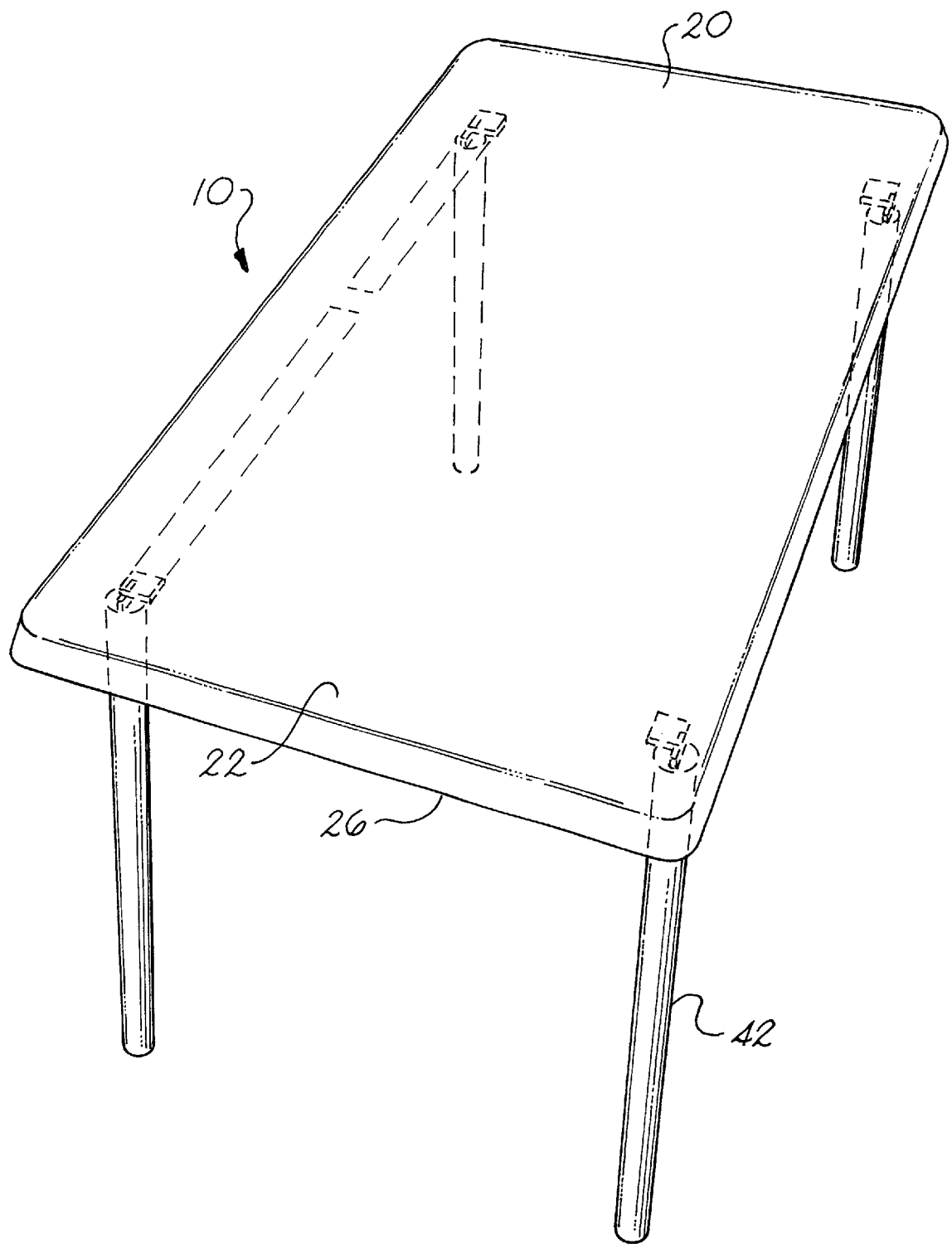
FIG. 1B is a perspective view of a folding table constructed in accordance with the present invention.

An additional embodiment in the invention may be seen in reference to FIG. 1B which illustrates a table with four folding legs. In this embodiment, each table leg 42 is attached to conventional folding hinges seen here as insert 40. Such folding hinges are conventionally used in the construction of folding tables and card tables. A portion of each hinge insert 40 is anchored within the rigid foam 30. Each hinge insert 40 and attached leg 42 are adjacent a corresponding depression 32 defined within the surface of the adjacent foam 30. Each depression 32 is preferably formed during the molding process by an appropriate shaped mold cover template associated with the molding platen and conformed to the dimensions which permits the hinge to close and thereby place the associated table leg within the confines of the depression 32. The molded depressions may be milled following the curing of the rigid foam.

The folded table as seen in FIG. 1B offers substantial advantages in terms of strength, weight, and durability compared to conventional folding tables. For instance, a standard card table lacks strength and rigidity for supporting heaving loads. Conventional folding tables of a sturdier construction typically have a particle board construction and/or a steel support frame which increases the table's weight. A table constructed according to the present invention has the combination of high strength along with light weight which facilitates commercial shipping as well as the end use of the table.

Figure 4A:
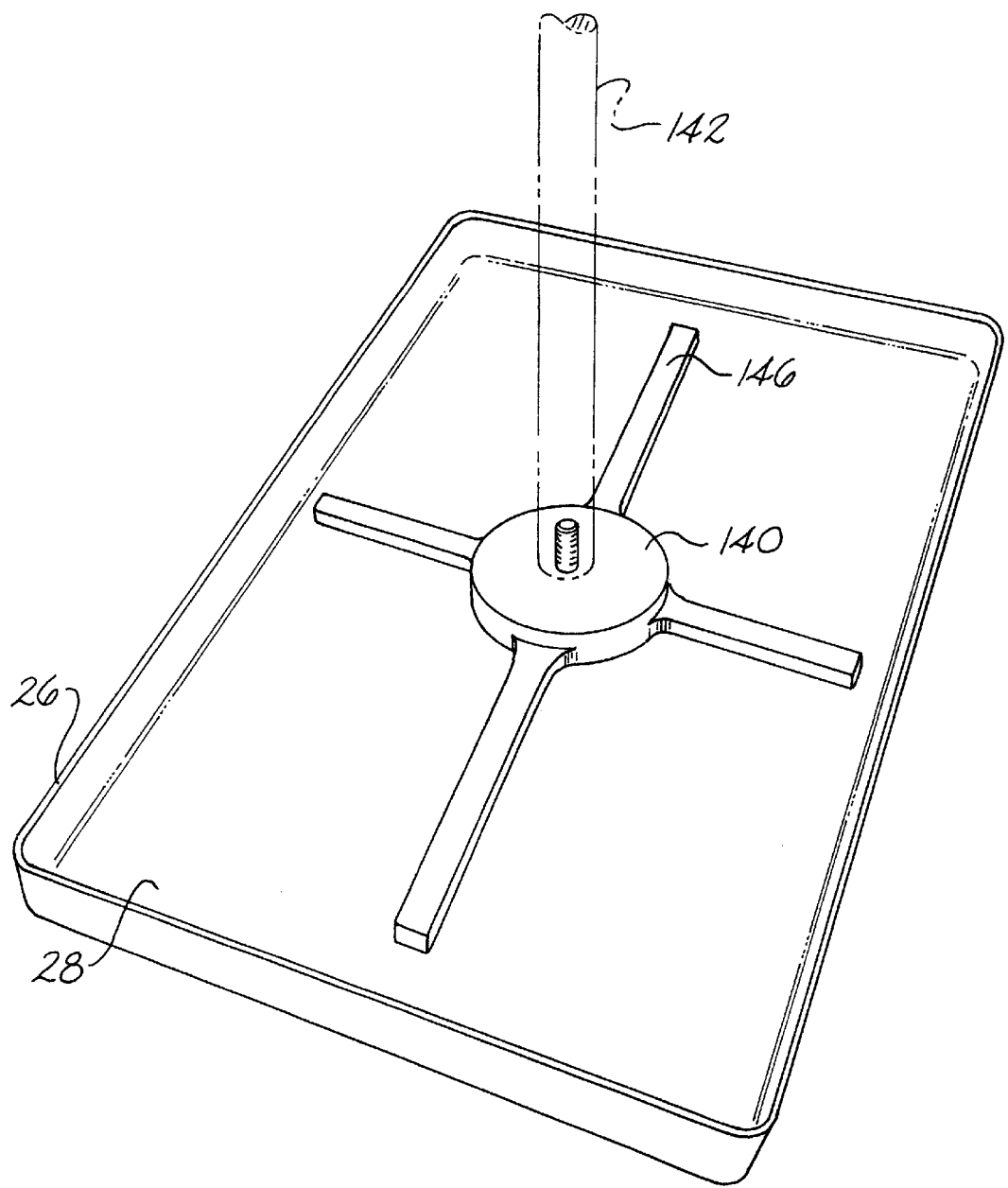
FIGS. 4A–4C set forth additional details of construction of a pedestal table according to the present invention.
Figure 4B:
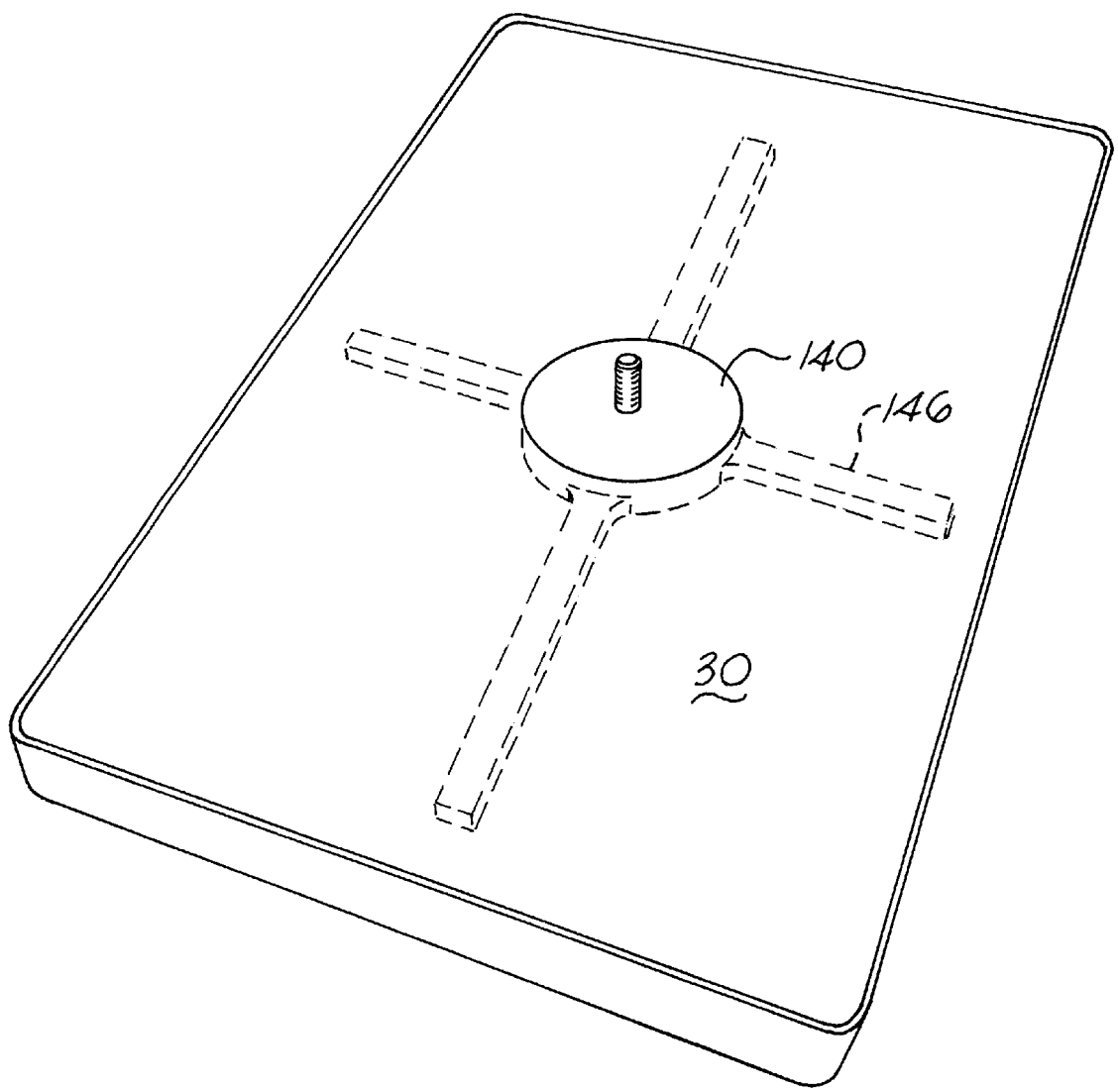
Figure 4C:
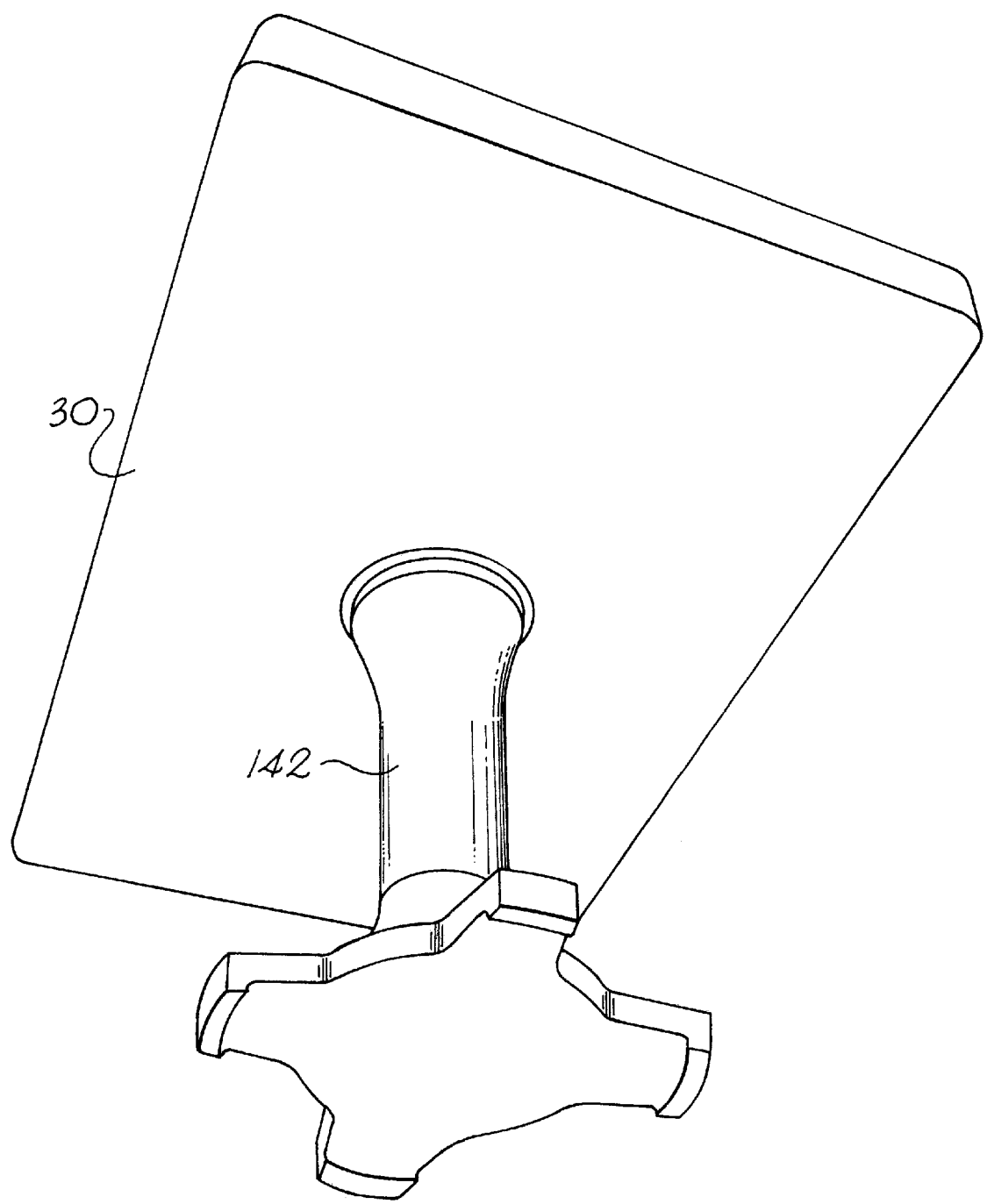

An additional embodiment of a work surface is seen in reference to FIGS. 4A–4C. As seen in FIG. 4C, a pedestal mounted table 110 may be provided which is secured on a pedestal mount 142. As seen in FIG. 4A, insert 140 is in the form of a mounting bracket having a threaded bolt for the mated engagement of a pedestal leg 142. As seen in reference to FIG. 4B, a portion of insert 140 is positioned above the outer foam surface while other portions are encapsulated by the foam. As seen in reference to FIGS. 4A and 4B, it is useful to provide insert extensions 146 which are integral with or otherwise attached to and form a part of insert 140. Such extensions 146 increase the surface area and hence the bond strength between the foam and the inserts 140. Further, the extensions 146 help distribute forces throughout the laminate.

The extensions 146 may be integral with the insert 140 or may be separately attached to a conventional insert 140 using some form of permanent attachment. In either case, the extension 146 provides for an increased surface area and hence increased strength and force distribution between the insert and the structural foam.

It has further been found advantageous to suspend load bearing inserts during the foaming process so that direct contact between the insert and the thermoplastic sheet are avoided. In this manner, forces will not transfer directly from the insert to the sheet material where, if in intimate contact, distortions or buckling of the surrounding sheet material may occur.

Figure 5:
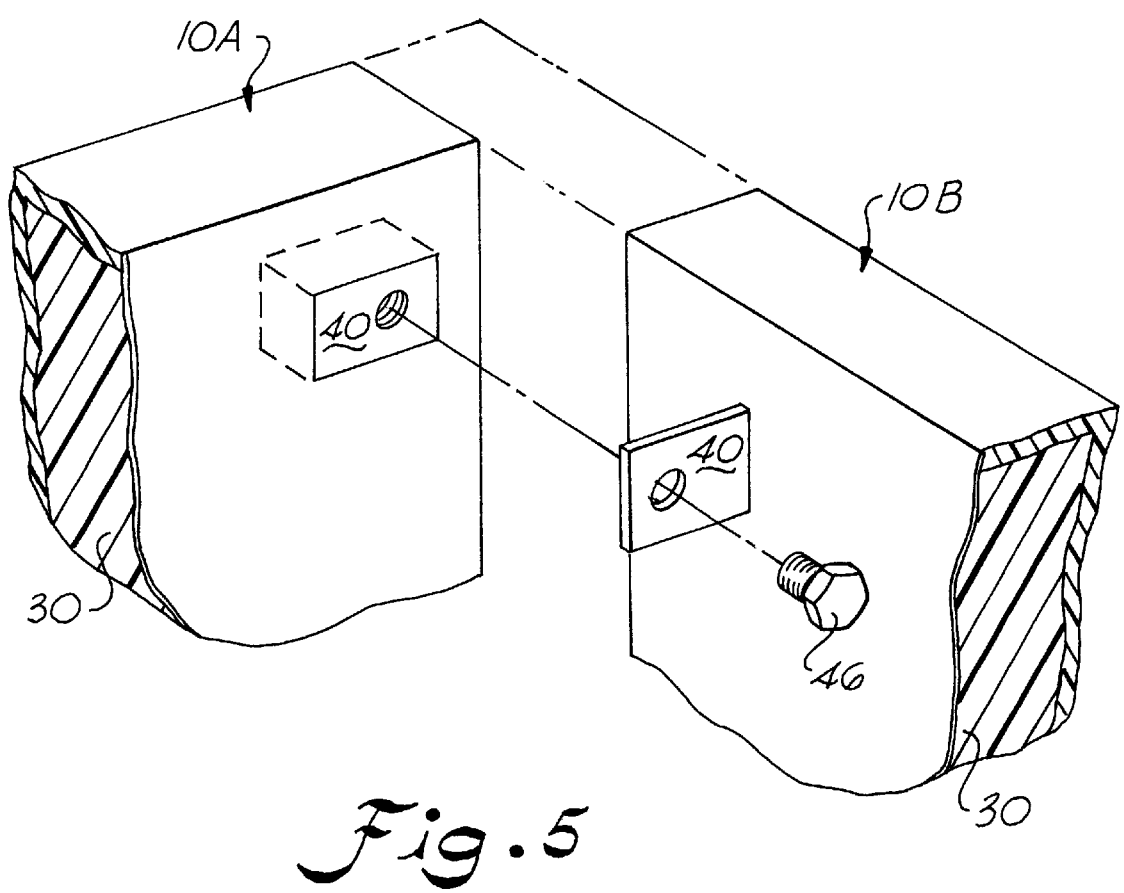
FIG. 5 is a perspective view showing two laminate panels being joined together.

As seen in reference to FIG. 5, the present laminates may be used to provide component parts for furniture construction. For instance, article 10A may be the upper surface of a shelf, cabinet, or dresser. Laminate 10B is a corresponding side panel of the above-referenced structure. A connector 46, seen here in the form of a threaded bolt, may be used to secure laminate 10A to 10B via the corresponding inserts 40.

Panels such as those seen in FIG. 5 may be provided and used in place of particle board and wooden board for consumer assembled furniture. Connective hardware may be provided at precise locations within the rigid foam. Traditional connectors such as locking cams, dowels, bolts, support clips, brackets, and other conventional hardware may be used to secure the assembled components. Further, the laminated panels of the present invention are resistant to moisture, are lightweight, have excellent strength and load-bearing characteristics, and may be easily disassembled and reassembled numerous times. Further, the rigid panels resist warping and flexing under heavy loads.

The present laminates have the exterior surface securely bonded to the inner foam core. As such, separation of the exterior surface from the lower surface is prevented. In conventional wood or plastic laminated furniture, the upper decorative or work surface will often separate from the underlying substrate. Such flaws are unsightly, and promote rapid deterioration of the laminated structure as moisture penetrates and contributes to the delamination process. Such delamination is of particular concern in the restaurant industry where separations between a laminate and the lower core material may constitute a violation of local health codes. The present laminate structure eliminates such problems. The surface of the laminate may be easily repaired by using various grades of abrasive paper or wool, along with various rubbing compounds.

Although various embodiments of the invention have been described using specific terms, devices, and methods, such description is for illustrative purposes only. The words used are words of description rather than of limitation. It is to be understood that changes and variations may be made by those of ordinary skill in the art without departing from the spirit or scope of the present invention, which is set forth in the following claims. In addition, it should be understood that aspects of the various embodiments may be interchanged, both in whole or in part. Therefore, the spirit and scope of the appended claims should not be limited to the description of the preferred versions contained therein.

That which is claimed is:

1. A process of forming a laminated article for use in furniture construction comprising:

providing a thermoplastic sheet;

warming the thermoplastic sheet to a softening temperature;

forming the sheet into a tray-shaped article having an exterior surface and an interior surface;

placing the tray-shaped article within a mold;

suspending at least one insert above the interior surface of the tray-shaped article;

forming in situ a structural foam, the structural foam bonding to at least a portion of the interior surface of the tray-shaped article opposite the insert and further bonding to at least a portion of the insert;

removing the tray-shaped article from the mold.

2. The process according to claim 1 wherein said step of suspending at least one insert further comprises providing an insert which comprises an attachment member for a vertical support.

3. The process according to claim 1 wherein the step of foaming a structural foam further defines providing at least one depression within an exterior surface of the foam.

4. The process according to claim 1 wherein said structural foam defines an exposed surface which is substantially parallel to said exterior surface of said sheet.

5. A process of forming a laminated article for use in furniture construction comprising:

providing a thermoplastic rigid sheet, said sheet having a thickness of at least 2 mm;

warming the thermoplastic sheet to a softening temperature;

forming the thermoplastic sheet into a tray-shaped article having an exterior surface and an interior surface;

placing the tray-shaped article within a mold;

suspending at least one insert above the interior surface of the thermoplastic sheet;

forming in situ a rigid foam, the rigid foam bonding to at least a portion of the interior surface of the thermoplastic sheet and to at least a portion of the insert, a portion of said form positioned between said insert and said interior surface opposite said insert; and, removing the article from the mold.

6. A process of forming a laminated article comprising:

providing a substantially rigid sheet comprising a thermoplastic material;

heating the thermoplastic material to a softening temperature;

forming the thermoplastic material into a tray-shaped configuration having an exterior surface, an interior surface, and an edge, an interior of the edge and the interior surface of said tray-shaped configuration defining a cavity;

placing said tray-shaped sheet within a mold;

suspending at least one insert within said cavity and above the interior surface, a portion of said insert extending outside of said cavity;

forming in situ a rigid foam within said cavity, said rigid foam bonding to at least a portion of the interior surface of the thermoplastic sheet and opposite the insert and further bonding to at least a portion of said insert;

removing the article form the mold.

7. The process according to claim 6 wherein said substantially rigid sheet further comprises a pigmented, wood grained, thermoplastic material.

8. The process according to claim 7 wherein said pigmented, wood grained, thermoplastic material has a thickness of at least 2 mm.

9. The process according to claim 6, wherein said rigid foam defines an exterior surface substantially parallel to said exterior surface of said thermoplastic material.

10. The process according to claim 9 wherein said exterior surface of said foam further defines a depression.

11. The process according to claim 6 wherein said rigid foam is substantially flush with an outer margin of said edge.

12. The process according to claim 6 wherein said step of suspending at least one insert further defines suspending a load bearing insert within said cavity.

* * * * *